(12) United States Patent
Woodhouse et al.

(10) Patent No.: US 10,035,435 B2
(45) Date of Patent: Jul. 31, 2018

(54) RECLINING REAR SEAT SYSTEM FOR A MOTOR VEHICLE

(71) Applicant: FORD GLOBAL TECHNOLOGIES, LLC, Dearborn, MI (US)

(72) Inventors: David Woodhouse, Troy, MI (US); Bonghoon Lukas Chung, Farmington Hills, MI (US); Moray Stuart Callum, Ann Arbor, MI (US); Soo Young Kang-Morales, Northville, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 14/833,842

(22) Filed: Aug. 24, 2015

(65) Prior Publication Data
US 2016/0288669 A1    Oct. 6, 2016

Related U.S. Application Data

(60) Provisional application No. 62/140,803, filed on Mar. 31, 2015.

(51) Int. Cl.
| | | |
|---|---|---|
| B60N 2/22 | (2006.01) | |
| B60N 2/02 | (2006.01) | |
| B60N 2/00 | (2006.01) | |
| B60N 2/90 | (2018.01) | |
| B60N 2/44 | (2006.01) | |

(52) U.S. Cl.
CPC .............. B60N 2/22 (2013.01); B60N 2/002 (2013.01); B60N 2/0252 (2013.01); B60N 2/4495 (2013.01); B60N 2/995 (2018.02)

(58) Field of Classification Search
CPC ........ B60N 2/22; B60N 2/0252; B60N 2/002; B60N 2/995
USPC ........................... 297/378.1, 243; 701/36, 49
See application file for complete search history.

(56) References Cited

U.S. PATENT DOCUMENTS

| | | | | |
|---|---|---|---|---|
| 3,288,527 | A * | 11/1966 | Martens | B60N 2/23 297/362.13 |
| 3,982,787 | A * | 9/1976 | Moll | B60N 2/06 296/65.13 |
| 4,909,572 | A | 3/1990 | Kanai | |
| 6,439,636 | B1 | 8/2002 | Kuo | |
| 6,773,067 | B2 | 8/2004 | Kim | |
| 6,783,178 | B2 * | 8/2004 | Kasahara | B64D 11/0641 297/217.3 |
| 2004/0262961 | A1 * | 12/2004 | Young | B60N 2/002 297/217.3 |
| 2006/0253241 | A1 * | 11/2006 | Bothe | B60N 2/002 701/49 |
| 2010/0318266 | A1 * | 12/2010 | Schaaf | B60K 35/00 701/49 |

* cited by examiner

*Primary Examiner* — Milton Nelson, Jr.
(74) *Attorney, Agent, or Firm* — Vichit Chea; King & Schickli, PLLC

(57) ABSTRACT

A reclining rear seat system is provided for a motor vehicle. That reclining rear seat system includes a front seat, a first actuator for displacing the front seat between a first position and a second position, a reclining rear seat and a second actuator for displacing the reclining rear seat between an upright position and fully reclined position. Further the system includes a controller configured to control the reclining rear seat system and a front seat occupant sensor.

9 Claims, 4 Drawing Sheets

RECLINING REAR SEAT SYSTEM FOR A MOTOR VEHICLE

This application claims the benefit of U.S. Provisional Patent Application Ser. No. 62/140,803 filed on 31 Mar. 2015, the full disclosure of which is incorporated herein by reference.

TECHNICAL FIELD

This document relates generally to the motor vehicle equipment field and, more particularly, to a reclining rear seat system for a motor vehicle.

BACKGROUND

In the motor vehicle industry there is a desire to increase comfort for rear seat passengers in all types of vehicles. However, increasing rear seat passenger comfort is challenging due to space constraints found in most vehicles. This document relates to a new and improved reclining rear seat system which provides additional space and a foot rest for enhanced rear seat passenger comfort.

SUMMARY

In accordance with the purposes and benefits described herein, a reclining rear seat system is provided for a motor vehicle. That reclining rear seat system comprises a front seat, a first actuator for displacing the front seat between a first position and a second position, a reclining rear seat, and a second actuator for displacing the reclining rear seat between an upright position and a fully reclined position. In addition the reclining rear seat system includes a controller configured to control the reclining rear seat system and a front seat occupant sensor.

Still further, the reclining rear seat system includes a foot rest. The foot rest is displaceable between a home position adjacent to the motor vehicle floor and a deployed position extending forward of the reclining rear seat toward the front seat.

More specifically, the front seat includes a seat back and a seat bottom. Further, the second position is vehicle forward of the first position with the seat back angled so as to overlie the seat bottom.

The reclining rear seat includes a rear seat back and a rear seat bottom forming an included angle A. That included angle A is smaller in the upright position than in the reclined position. Still further, the reclining rear seat system includes a foot rest actuator for deploying the foot rest between the home position and the deployed position.

In accordance with an additional aspect, a method is provided for reclining a rear seat in a motor vehicle. That method may be broadly described as comprising the steps of (a) detecting, by a sensor, the presence of an occupant in the front seat, (b) displacing, by a first actuator, the front seat vehicle forward if no occupant is detected so as to increase space behind the front seat and (c) reclining, by a second actuator, a rear seat in the increased space behind the front seat.

The method may be further described as including the step of deploying, by a third actuator, a foot rest for a rear seat occupant. Further the method may include the step of folding, by the first actuator, a front seat back over a front seat bottom so that the front seat back at least partially overlies the front seat bottom. Still further the method includes controlling operation of the first actuator, the second actuator and the third actuator by a controller configured to control the reclining rear seat system.

In the following description, there are shown and described several preferred embodiments of the reclining rear seat system. As it should be realized, the reclining rear seat system is capable of other, different embodiments and its several details are capable of modification in various, obvious aspects are without departing from the system as set forth and described in the following claims. Accordingly, the drawings and description should be regarded as illustrative in nature and not as restrictive.

BRIEF DESCRIPTION OF THE DRAWING FIGURES

The accompanying drawing figures incorporated herein and forming a part of the specification, illustrate several aspects of the reclining rear seat system and together with the description serve to explain certain principles thereof.

Reference will now be made in detail to the present preferred embodiments of the reclining rear seat system, examples of which are illustrated in the accompanying drawing figures.

DETAILED DESCRIPTION

Figure 1:
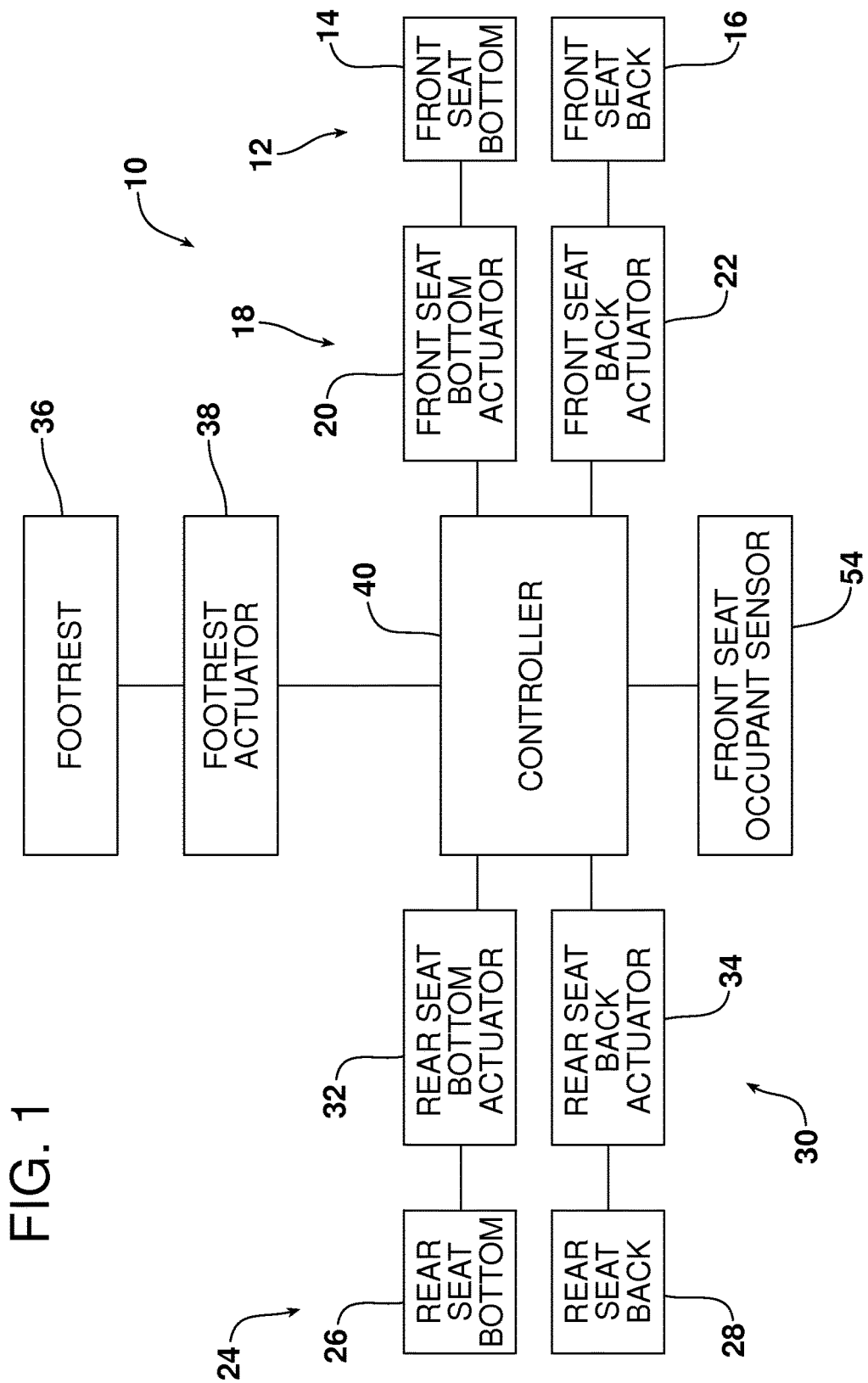
FIG. 1 is a schematic block diagram of the reclining rear seat system.

Reference is now made to FIG. 1 which is a schematic block diagram of the reclining rear seat system 10 that is the subject matter of this document. As illustrated, the system 10 includes a front seat 12 having a front seat bottom 14 and a front seat back 16.

A first actuator 18 is provided for displacing the front seat 14 between a first position and a second position that will be described in greater detail below. In the illustrated embodiment the first actuator 18 comprises a front seat bottom actuator 20 connected to the front seat bottom 14 and a front seat back actuator 22 connected to the front seat back 16. As will be described in greater detail below, the front seat bottom actuator 20 displaces the front seat bottom 14 along a track (not shown) on the floor of the vehicle between first and second positions while the front seat back actuator 22 displaces the front seat back so as to adjust the angle between the front seat back 16 and the front seat bottom 14.

The reclining rear seat system 10 also includes a reclining rear seat 24 including a rear seat bottom 26 and a rear seat back 28. A second actuator 30 displaces the reclining rear seat 24 between an upright position and a fully reclined position. In the illustrated embodiment, the second actuator 30 comprises a rear seat bottom actuator 32 connected to the rear seat bottom 26 and a rear seat back actuator 34 connected to the rear seat back 28.

Figure 1A:
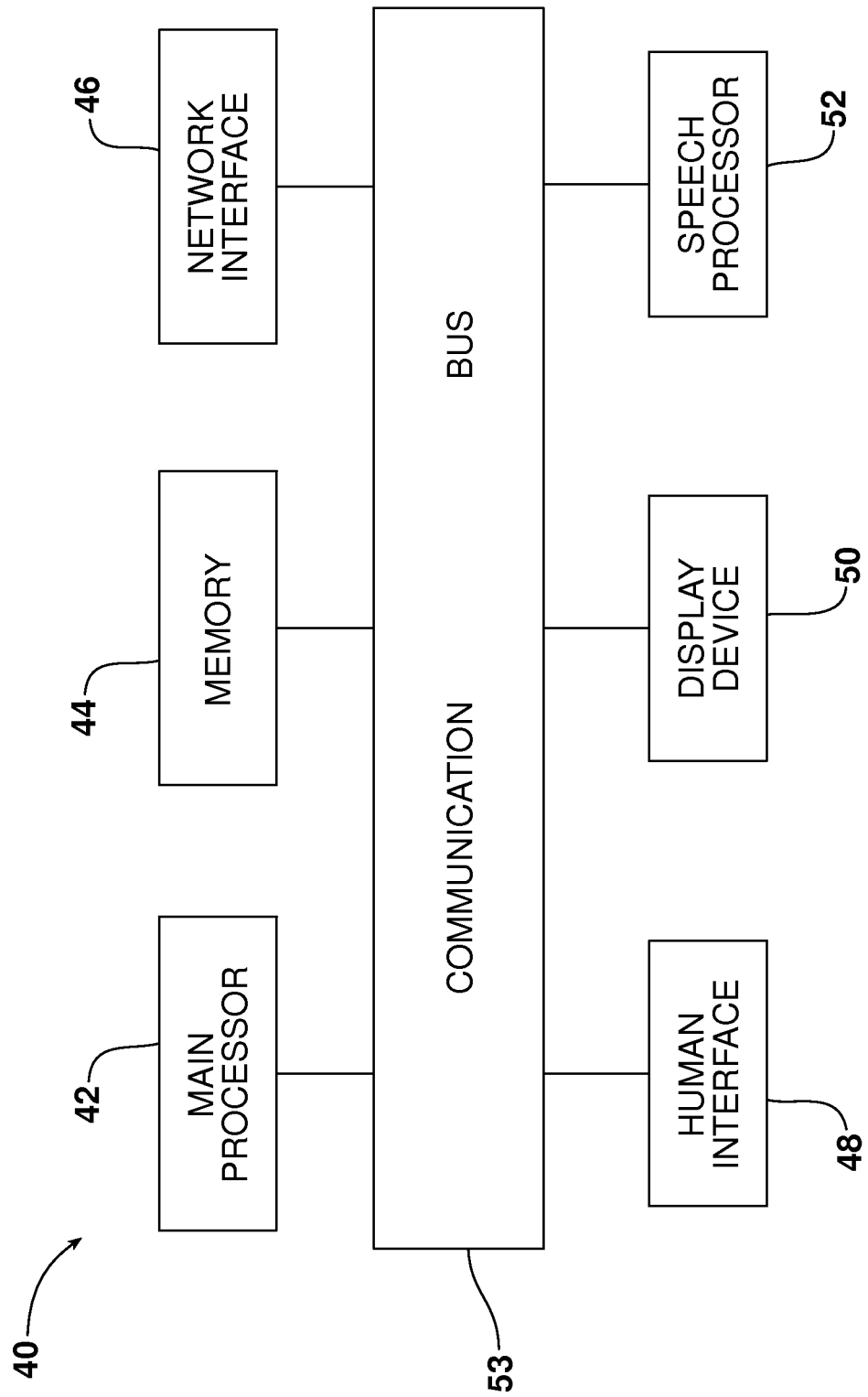
FIG. 1a is a schematic block diagram of the controller for the reclining rear seat system.

As also illustrated in FIG. 1, the reclining rear seat system 10 includes a foot rest 36 for the rear seat occupant and a foot rest actuator 38. The reclining rear seat system 10 also includes a controller 40, such as a dedicated microprocessor or an electronic control unit (ECU) that is configured to control the reclining rear seat system 10 including the first actuator 18, the second actuator 30 and the third or foot rest actuator 38. In one possible embodiment, the controller 40 comprises one or more processors 42, one or more memories 44 and one or more network interfaces 46 (see FIG. 1a). The controller 40 may also include a human interface 48, such as a control pad, and/or a multifunction display with touchscreen capability 50. In another possible embodiment, the controller 40 may include a speech processor 52 so that the reclining rear seat system 10 will respond to voice command. The main processor 42, the memory 44, the network interface 46, the human interface 48, the display device 50 and the speech processor 52 all communicate with each other over the communication bus 53.

As also illustrated in FIG. 1, the reclining rear seat system 10 includes a front seat occupant sensor 54 connected to the controller 40. The front seat occupant sensor 54 may take one of any number of forms including, for example, any type of presence sensor such as utilized to activate and deactivate the airbag system for the passenger side front seat. Thus, the front seat occupant sensor 54 may be, for example, a weight sensor, an infrared sensor, a camera or the like.

Figure 2:
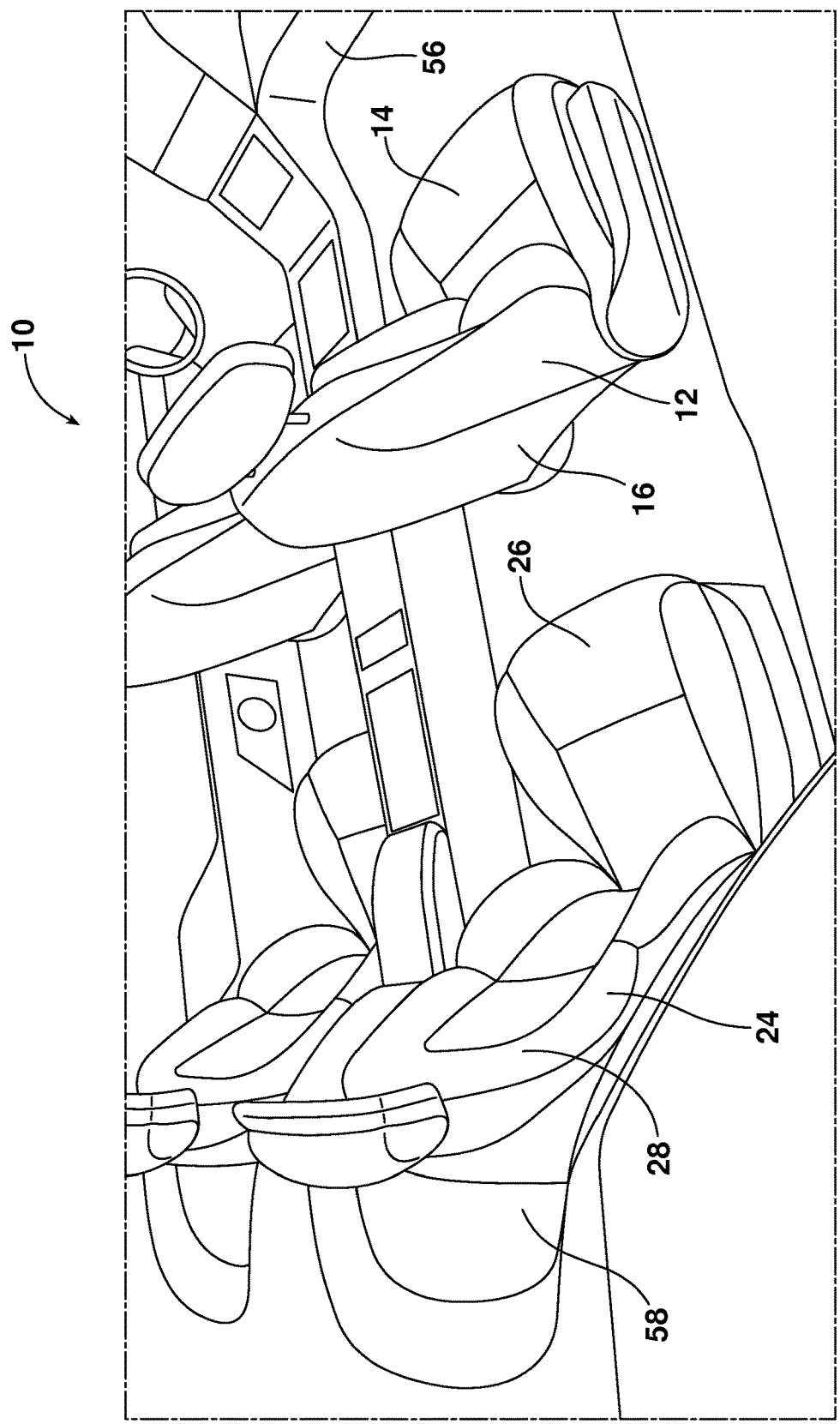
FIG. 2 is a perspective view illustrating the rear seat in a standard, upright position behind a front seat also in a standard, upright position.

Reference is now made to FIG. 2 which illustrates the reclining rear seat system 10 with the front seat 12 in a standard, first or upright position such as it is typically oriented in order to accommodate a front seat passenger and the rear seat 24 also in an upright position for accommodating a rear seat passenger. When an occupant of the rear seat 24 wishes to displace the rear seat into a fully reclined position, that occupant may initiate that action by manipulation of the human interface 48, appropriate activation through the multifunction touchscreen 50 or by voice command via the speech processor 52. In response to an activation signal, the controller 40 confirms the presence or absence of an occupant in the front seat 12 via data received from the front seat occupant sensor 54. If the front seat 12 is unoccupied, the controller 40 controls the operation of the actuators 18, 30 and 38 to cause the front seat to move forward and the rear seat 24 to be displaced into the fully reclined position illustrated in FIG. 3.

More specifically, the controller 40 activates the front seat bottom actuator 20 which moves the front seat bottom 14 vehicle forward as far as possible toward the dashboard 56. Further the controller 40 causes the front seat back actuator 22 to displace the front seat back 16 of the vehicle forward so as to at least partially overlie the front seat bottom 14 until the front seat 12 reaches the second position illustrated in FIG. 3. As should be appreciated, by displacing the front seat 12, including the front seat bottom 14 and front seat back 16, as far forward as possible, space behind the front seat 12 is maximized for the added comfort of the rear seat occupant.

The added space provided behind the front seat 12 allows the reclining rear seat 24 to be displaced into the fully reclined position. Accordingly, the controller 40 causes the rear seat bottom actuator 32 to displace the rear seat bottom of the vehicle forward. Further, the controller 40 causes the rear seat back actuator 34 to recline the rear seat back 28 into the recess 58 provided in the vehicle trim behind the seat. Thus, the included angle A formed between the rear seat bottom 26 and rear seat back 28 is increased when the rear seat 24 is displaced into the fully reclined position.

Figure 3:
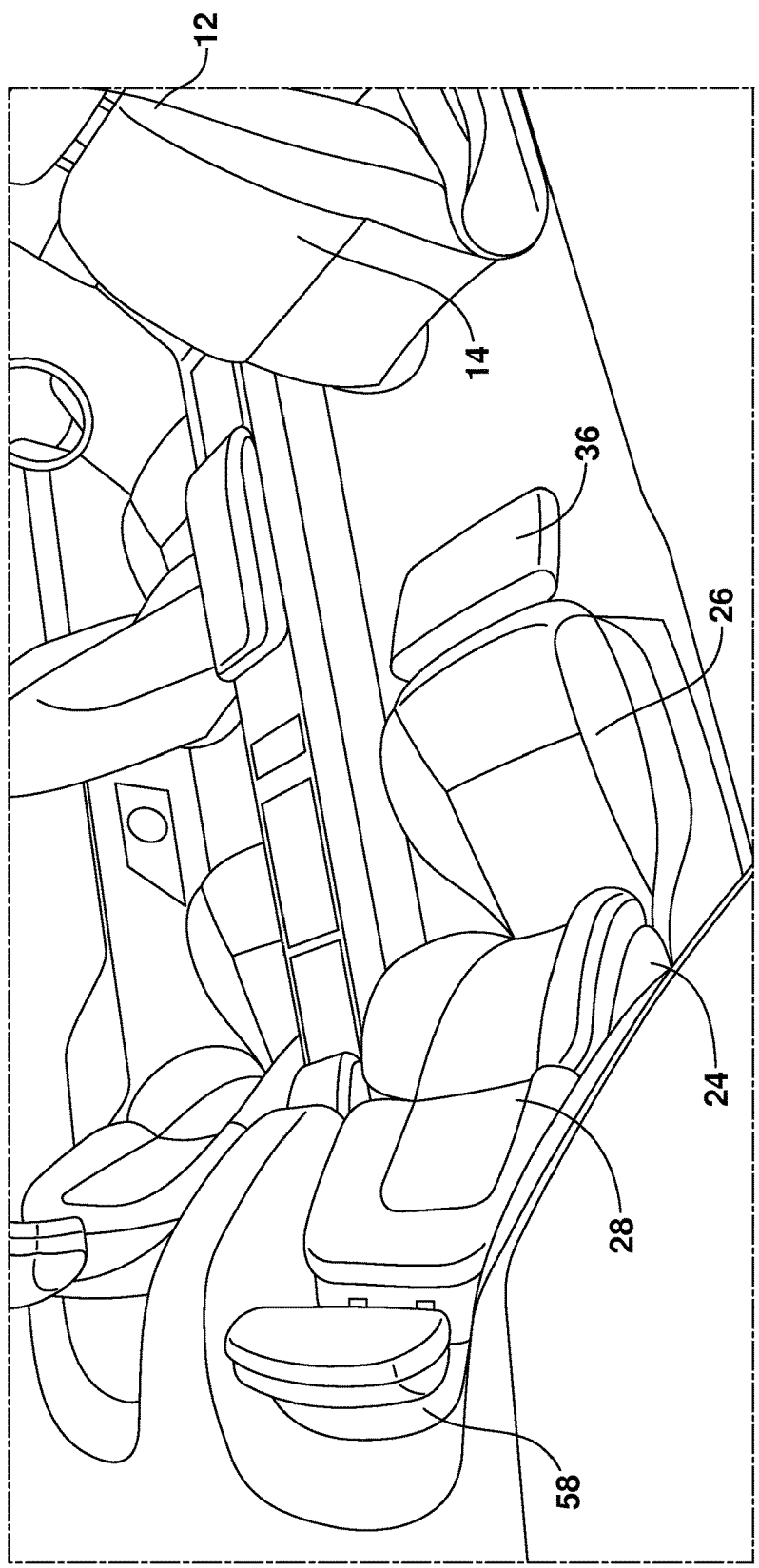
FIG. 3 is a perspective view illustrating the rear seat displaced fully forward in the vehicle in order to create extra space for the rear seat shown in the fully reclined position with the foot rest deployed.

In addition, the foot rest 36 is deployed from a home position adjacent the vehicle floor and the front face of the rear seat bottom 26 to a deployed position projecting forward of the rear seat bottom 26. Note the deployed foot rest 36 as illustrated in FIG. 3. Together, the added space provided by displacing the front seat 12 forward, the reclining of the rear seat 24 and the deployment of the foot rest 36 greatly enhance the comfort of the rear seat passenger.

In contrast, when a rear seat occupant activates the system 10 in order to recline the rear seat and the front seat occupant sensor 54 provides data to the controller 40 indicating there is an occupant in the front seat, the front seat 12 is not displaced into the second or vehicle forward position and the rear seat 24 will not be displaced into the fully reclined position as illustrated in FIG. 3.

As should be appreciated from the foregoing, the reclining rear seat system 10 facilitates a method of reclining a rear seat 24 in a motor vehicle. That method may be broadly described as including the steps of: (a) detecting, by a front seat occupant sensor 54, the presence of an occupant in the front seat 12, (b) displacing, by a first actuator 18, the front seat 12 vehicle forward if no occupant is detected so as to increase the space behind the front seat and (c) reclining, by a second actuator 30, the rear seat 24 in the increased space behind the front seat.

Further the method includes deploying, by a third actuator 38, a foot rest 36 for the rear seat occupant. In addition, the method may include folding, by the first actuator 18 a front seat back 16 over a front seat bottom 14 so the front seat back at least partially overlies the front seat bottom. Still further, that method includes controlling operation of the first actuator 18, second actuator 30 and third actuator 38 by a controller 40 configured to control the reclining rear seat system 10.

The foregoing has been presented for purposes of illustration and description. It is not intended to be exhaustive or to limit the embodiments to the precise form disclosed. Obvious modifications and variations are possible in light of the above teachings. All such modifications and variations are within the scope of the appended claims when interpreted in accordance with the breadth to which they are fairly, legally and equitably entitled.

What is claimed:

1. A reclining rear seat system for a motor vehicle, comprising:
   a front seat;
   a front seat occupant sensor;
   a first actuator for displacing said front seat between a first position and a second position;
   a reclining rear seat;
   a second actuator for deploying said reclining rear seat between an upright position and a fully reclined position;
   a controller configured to control the reclining rear seat system including the first actuator and the second actuator in response to data received from said front seat occupant sensor.

2. The reclining rear seat system of claim 1, further including a foot rest, said foot rest being displaceable between a home position adjacent a floor of said motor vehicle and a deployed position extending forward of said reclining rear seat toward said front seat.

3. The reclining rear seat system of claim 2, wherein said front seat includes a seat back and a seat bottom.

4. The reclining rear seat system of claim 3, wherein said second position is vehicle forward of said first position with said seat back angled so as to overlie said seat bottom.

5. The reclining rear seat system of claim 4, wherein said reclining rear seat includes a rear seat back and a rear seat bottom forming an included angle A, said included angle A in said upright position being smaller than said included angle A in said fully reclined position.

6. The reclining rear seat system of claim 5, further including a foot rest actuator for displacing said foot rest between said home position and said deployed position.

7. The reclining rear seat system of claim 1, wherein said front seat includes a front seat bottom and a front seat back and said first actuator includes a front seat bottom actuator and a front seat back actuator.

8. The reclining rear seat system of claim 7, wherein said reclining rear seat includes a rear seat bottom and a rear seat back and said second actuator includes a rear seat bottom actuator and a rear seat back actuator.

9. A reclining rear seat system for a motor vehicle, comprising:
- a front seat;
- a first actuator for displacing said front seat;
- a front seat occupant sensor;
- a reclining rear seat;
- a second actuator for displacing said reclining rear seat; and
- a controller configured to respond to data from said front seat occupant sensor, displace said front seat forward if no occupant is detected in said front seat and recline said rear seat in increased space created behind said front seat.

* * * * *